United States Patent [19]

Braun et al.

[11] Patent Number: 4,513,711
[45] Date of Patent: Apr. 30, 1985

[54] APPARATUS FOR REGULATING THE IDLING SPEED OF INTERNAL COMBUSTION ENGINES

[75] Inventors: Günter Braun, Freiberg; Alfred Kratt, Trossingen; Rolf Schleicher, Leinfelden, all of Fed. Rep. of Germany

[73] Assignee: Robert Bosch GmbH, Stuttgart, Fed. Rep. of Germany

[21] Appl. No.: 524,685

[22] Filed: Aug. 19, 1983

[30] Foreign Application Priority Data

Sep. 23, 1982 [DE] Fed. Rep. of Germany ....... 3235186

[51] Int. Cl.³ .............................................. F02D 11/10
[52] U.S. Cl. .................................... 123/339; 123/589; 123/352
[58] Field of Search ........................ 123/352, 339, 589

[56] References Cited

U.S. PATENT DOCUMENTS

| 4,337,742 | 7/1982 | Carlson | 123/339 |
| 4,380,979 | 4/1983 | Takase | 123/339 |
| 4,425,888 | 1/1984 | Engel | 123/352 |
| 4,428,341 | 1/1984 | Hassler | 123/339 |
| 4,462,360 | 7/1984 | Kobayashi | 123/339 |
| 4,471,735 | 9/1984 | Collonia | 123/339 |

Primary Examiner—Ronald B. Cox
Attorney, Agent, or Firm—Frishauf, Holtz, Goodman & Woodward

[57] ABSTRACT

In a system for regulation of the idling speed of an internal combustion engine acting through an electrical positioning means for the minimum-opening position of the throttle valve, the building-up of troublesome fluctuations in engine speed as the result of the characteristics of the regulation loop is counteracted in response to detection of the rise of such fluctuations or of their imminence as the result of an excessively rich mixture (on the basis of the signal from a probe in the exhaust pipe). When such a condition is detected, the amplification factors in the controller stage of the regulation loop are reduced, the reference desired idling speed value is raised and the lower limit of the regulation range is also raised. These parameters are returned to normal when the throttle valve moves away from its idling speed position.

10 Claims, 2 Drawing Figures

APPARATUS FOR REGULATING THE IDLING SPEED OF INTERNAL COMBUSTION ENGINES

This invention concerns apparatus for regulating engine idling speed, for example in a motor vehicle, in which the actual engine speed is compared with a reference idling speed value and the output of the comparison stage is provided to a controller, the output of which, subject to various additions or corrections, controls a positioning mechanism for the minimum air intake setting of the throttle valve of the engine.

Apparatus of that kind is known from German published patent application DE-OS No. 30 39 435 having a disclosure corresponding to that of U.S. Pat. No. 4,441,471, filed Oct. 19, 1981, owned by the Assignee of the present application.

A disadvantage of the system described in the reference just mentioned has been found, which is that when the fuel-air mixture is too rich (fuel content higher than stoichiometric) engine speed fluctuations build up which can become so large that the engine will come to a stop. when the transmission is coupled to the engine, after a short burst of acceleration, strong bucking can occur. These speed fluctuations are generated or at least amplified by the idling speed regulating system having preferably a PID controller characteristic.

It is an object of the present invention to provide an idling speed regulating system that can incorporate a PID controller without making the system subject to fluctuations or oscillations in the idling speed when the fuel-air mixture is too rich. Briefly, either the excessive richness of the fuel/air mixture or the presence of excessive speed fluctuations is detected by a suitable detecting device and in response thereto either the reference idling speed is raised or one of the components of the controller characteristic is drastically reduced, or else the lower limit of a range-limiting signal is raised. These measures can be used individually, or two or all three can be combined with each other. An immediate reduction of the speed fluctuations is thereby produced, the effect of which is the stronger, the more and the stronger these remedial measures are designed to be.

The recognition of the occurrence of the interfering engine speed fluctuations or the recognition of the risk of such an occurrence is advantageously performed by a measuring device for directly detecting speed fluctuations or one for indirectly detecting their likelihood by detecting an excessively rich mixture. The corrective measures respond when the amplitude of the speed fluctuations exceeds a prescribed value while the fluctuations alternate in sign or when acceleration or deceleration exceeding a prescribed value is found while both are present, in alternation, or when the signal of an exhaust gas probe understeps for a prescribed time a limit value in the "rich mixture" range. These different recognition devices can be used alone or in simultaneous or sequential combination.

The above functions for opposing oscillatory or jerky operations of the engine are immediately taken out of action whenever the throttle valve in the intake duct of the engine is displaced out of the idling position or when the actual speed deviates from the reference or desired speed by some prescribed value.

THE DRAWINGS

The invention is further described by way of illustrative example with reference to the annexed drawings, in which:

FIG. 1 shows an engine idling speed control system in which the invention is incorporated, and FIG. 2 is a function flow chart or sequence chart for explaining the manner of operation of the invention.

DESCRIPTION OF THE ILLUSTRATED EMBODIMENT

Figure 1:
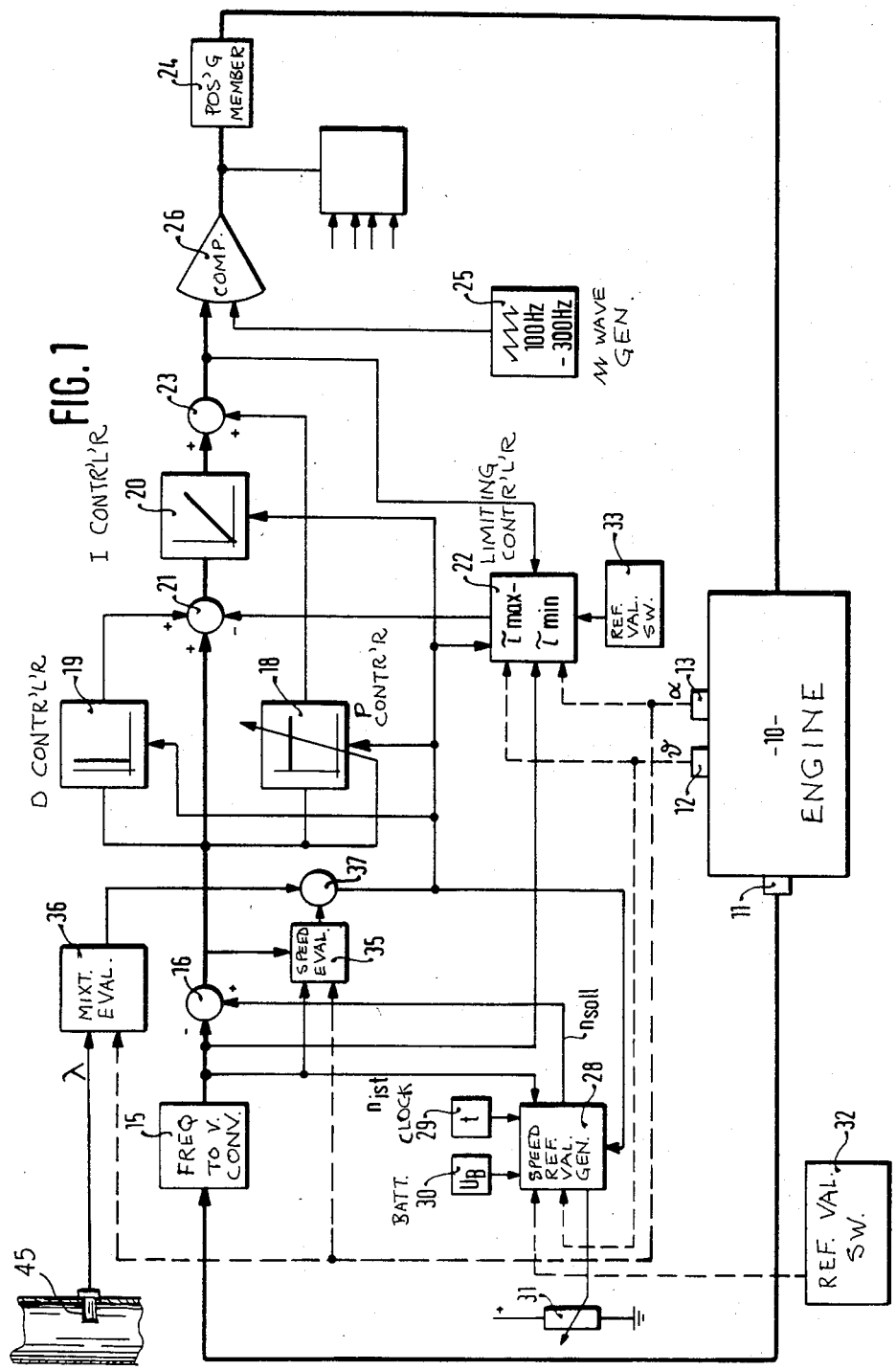

The system illustrated in FIG. 1 is for controlling the idling speed of an engine with externally energized ignition. The engine 10 has a speed measuring transducer 11, a temperature transducer 12 and a transducer 13 for providing a signal representative of the throttle valve position. The speed signal from the transducer 11 goes to a frequency/voltage converter 15 and then to a comparator 16 for comparing actual speed with a desired or reference speed. Following the comparator 16 is the regulator proper which is a controller having three stages 18, 19 and 20 respectively having proportional (P), differential (D) and integral (I) characteristics which contribute to the overall combined characteristic of the controller. Between the comparator 16 and the integral controller 20 is another summing circuit 21 where the output of the differential controller 19 is additively combined with the output of the comparator 16 and there is subtracted from the resulting sum a limiting signal from a limiting controller 22. Both the I and the P controllers provide their outputs to a summing circuit 23. The output signal of the latter provides part of an input signal for a positioning device 24, but to provide a desired pulsed operation of the positioning member, that input signal is first combined in a comparator 26 with the output signal of a sawtooth wave generator 25 of a frequency of somewhere between about 100 and 300 Hertz. The mechanical output of the positioning member 24 is applied to the engine in such a way that the desired idling speed is produced by control of the air throughput in the intake duct of the engine.

The arrow in the block representing the proportional controller 18 indicates the possibility of changing the amplification factor according to the magnitude of an input signal. Furthermore, the integration constant of the I controller in up-and-down direction can be constituted in any desired way as a function of the speed deviation and of the temperature.

A speed reference value signal generator 28 supplies at its output a nominally desired speed signal to the comparator 16. The speed reference value made available depends, for example, on the momentary actual speed, the temperature, the time, the supply voltage at the moment and the nominally desired speed. There can further be superimposed thereon a processed transmission control signal, in order to avoid abrupt changes in engine speed when automatic transmissions are changed from position "N" into position "D". In order to make possible taking account of all these influencing magnitudes, the reference speed value generator 28 is connected to the outputs of the frequency/voltage converter 15, the temperature transducer 12, a clock 29 providing a time signal and of course with the battery voltage source 30. A potentiometer 31 represents means for adjusting the nominally desired speed. Finally a reference value switch 32 is provided which is controlled by the state of the transmission at the particular time.

The limiting controller 22 also receives, in addition to the input signal from the output of the summing circuit 23 for the regulating operation proper, supplementary pulses regarding speed, temperature and throttle valve position and likewise a signal from a reference value switch 33 which may, but does not need operate in the same manner as the reference value switch 32. What is essential is that the limiting control should operate both in the case of idling and in the case of an open throttle valve and therefore should control the limiting function in a manner dependent at least upon speed and temperature.

The components and their interconnections described up to now are arranged and operate substantially as they operate in the prior art system disclosed in DE-OS 30 39 435 and in the above-mentioned copending U.S. patent application, the full disclosure of which is hereby incorporated by reference. Since the manner of operation and the course of the various functions are there described in detail, it is not necessary to go into these matters any further here.

In the context above described, there is newly provided in accordance with the present invention a measurement and evaluation device 35 for detecting speed fluctuations of a certain size and duration to which there are provided as inputs the actual value of speed and the error signal output of the comparator 16, as well as the throttle valve signal. Furthermore, an evaluation device 36 is provided for the output signal $\lambda$ of an exhaust gas probe 45 shown in FIG. 1. The throttle valve signal is also provided to the evaluation circuit 36, which may be referred to as a rich-mixture detector. Both devices 35 and 36 provide outputs to a comparison stage 37 which provides an output affecting the controllers 18, 19 and 20 in the sense of a reduction of the amplification factor, an effect on the speed reference value control stage 28 in the sense of an increase of the speed reference value and an effect on the limiting controller 22 in the sense of raising the lower limit of the regulating range ($\lambda$ min).

The manner of operation of the newly added combination of components 35, 36 and 37 consist essentially in preventing undesired building up of engine speed fluctuations by the regulating loop of the idling speed control. Such fluctuations are detected in the measuring and evaluation device 35 for detecting significant speed fluctuations. This detection operation is performed by built-in threshold value recognition circuits which recognize the crossing of the regulation deviation over an upper threshold value and beneath a lower threshold value. If such overstepping and understepping occur successively within a predetermined period of time, an output signal is produced. Such an output signal can for example be generated only if a certain number of such oversteppings or understeppings has taken place. As a supplementary or alternative recognition for engine speed fluctuations, it is possible to utilize a built-in differentiating stage which forms the derivative $dn/dt$ of the actual speed value. The output thus formed is then supplied to a built-in threshold value device and it is then investigated whether upper and lower values have been successively overstepped and understepped respectively. Requirements regarding the height of the threshold value, the number of over and understeppings and the prescribed period of time can be prescribed and realized as may be desirable or appropriate. Further possibilities for the recognition of engine speed fluctuations in various forms are of course available. It is essential merely that periodic engine speed fluctuations can be unambiguously recognized in as short a time as possible.

The evaluator 36 for $\lambda$ signals operates to detect indirectly the engine speed fluctuations resulting from an excessively rich fuel-air mixture. A threshold value is provided for the $\lambda$ signal, the understepping of which for a certain period of time ($\lambda$ values smaller than 1 indicate a mixture that is too rich) produce an output signal in the form of a trigger for a response signal. This threshold value recognition is either provided in the evaluation circuit 36 or in the case of an internal combustion engine with $\lambda$ regulation, is already provided in the system.

The above-mentioned and described methods for recognition or anticipation of engine speed fluctuations can be provided as alternative possibilities or combined in any desired combination. If one of the detector devices 35 and 36 produces a signal, that already described effects on the controllers 18, 19 and 20, the reference speed value control stage 28 and the limiting regulator 22 are put into effect. These provisions serve on the one hand to weaken the controller characteristics and, on the other hand, to produce a shift into a non-critical regulation range, so that the engine speed fluctuations are reduced or prevented. The displacement of the magnitudes mentioned can be shifted either to predetermined fixed values or shifted continuously for a sufficiently long time until the engine speed fluctuations no longer appear. Thus, the reduction of the amplification factor or factors of the controllers 18, 19 and 20 can take place all the way down to the value zero. When the shift takes place to a prescribed value, then this shift can also, for example, be produced in a manner or to an extent dependent upon temperature.

The above-mentioned effects on the regulation loop for idling speed control can also take place individually or in any suitable combination. Sequential effect of the various remedial operations can be provided in which the next operation is undertaken if the previously undertaken operation does not lead to the desired result.

Figure 2:
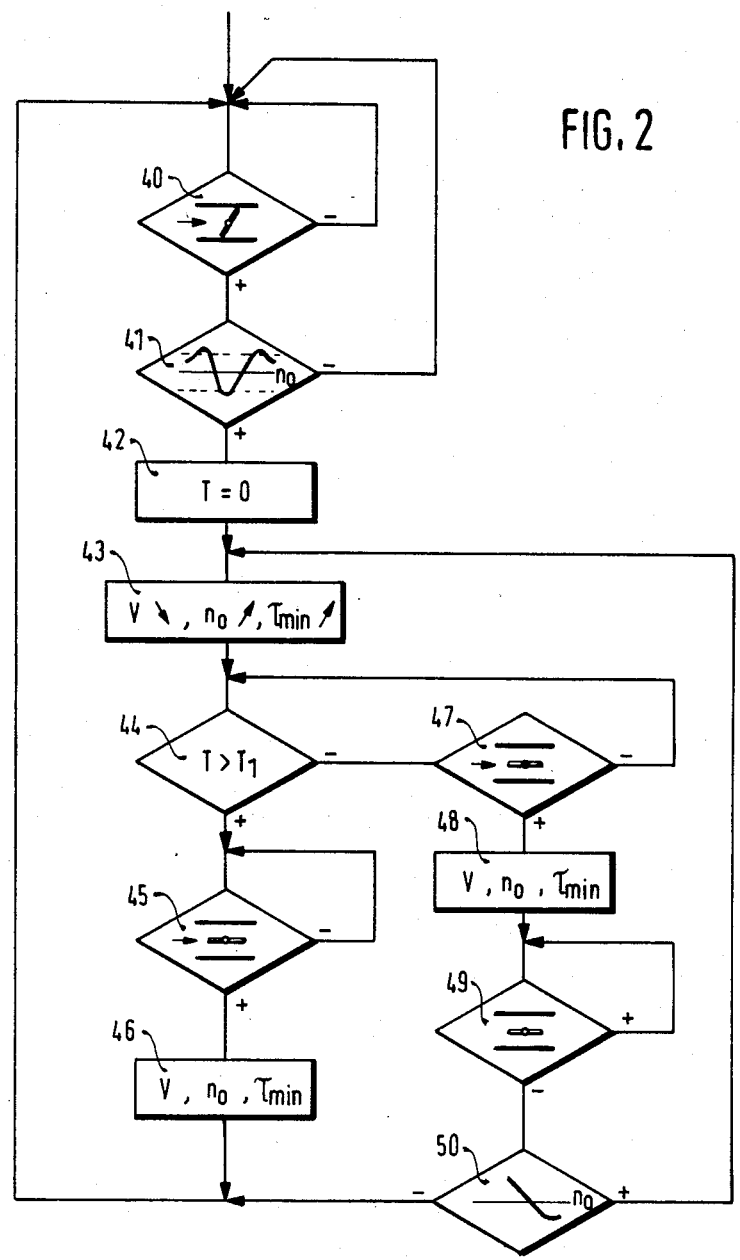

The functional flow chart shown in FIG. 2 shows the various steps in the operation of the invention in more detail. The flow chart applies to an embodiment of the invention which, although corresponding to FIG. 1, is constituted entirely in the form of a microcomputer, including in the microcomputer the devices 35 and 36 for evaluating fluctuations in the engine, speed signal produced by the combination of the transducer 11 and the signal converter 15 and changes in the air fuel mixture sensed by the exhaust gas probe 45 shown in FIG. 1.

As shown in FIG. 2, the first step of an operational cycle is to determine whether the throttle valve is in the position for engine idling (step 40). If that is the case, then the detecting devices 35 and 36 are interrogated, as already described, regarding whether significant engine speed fluctuations are present, or in the case of device 36, are imminent (step 41). If that is the case, a timing counter is reset (step 42) and the downward shift of the amplification factors B, the upward shift of the reference desired speed value $n_o$ and the upward shift of the lower limit of the regulating range $\lambda_{min}$ are produced as already described (step 43). Next the timing counter is interrogated regarding whether the predetermined time $T_1$, corresponding for example to a lapse of 2.5 minutes, has been reached (step 44). If that is the case, the position of the throttle valve is again observed (step 45). If it is in the idling position, the cycle enters a waiting loop until the throttle valve opens. Thereafter the parameters V, $n_o$ and $\lambda_{min}$. mentioned above are returned to their original values (step 46) and a new operation cycle is begun.

If, in contrast to the normal cycle just described, the throttle valve opens before the time $T_1$ is reached (step 47), as might be expected, the above-mentioned parameters V, $n_o$ and $\tau_{min}$. are put back to their original values (step 48), but in this case that operation is followed by another waiting loop until the throttle valve goes back again into the engine idling position (step 49). If at this juncture the engine speed understeps the reference desired speed $n_o$ by a predetermined amount (step 50), a renewed shift of the parameters V, $n_o$ and $\tau_{min}$. is produced (return to step 43). On the other hand, if no significant downward swing of the engine speed below the reference speed $n_o$, a whole new operating cycle begins (return to step 40).

As an alternative or as a supplement to the criterion of the opening of the throttle value, the criterion of overstepping of a predetermined speed value by the actual engine speed can be introduced into the flow chart. In this case also the above-mentioned parameters V, $n_o$ and $\lambda_{min}$. will be restored to their original values.

It will thus be seen that although the invention has been describd with reference to a particular illustrative embodiment and a particular example of a cycle of operation, variations and modifications are possible within the inventive concept.

We claim:

1. Apparatus for regulating the idling speed of an internal combustion engine of which the speed is controllable by a throttle valve in the intact duct of the engine, said apparatus including an electrically operable mechanical device (24) for determining the rate of air intake in the idling condition by setting a minimum-air-intake limit for the air intake control function performed by said throttle valve, and electrical comparison stage (16, 28) for comparison of actual engine speed with a reference desired speed value and having an output representative of said comparison, a controller stage (18, 19, 20) having components respectively of proportional, integral and differential (PID) behavior types and means for combining the outputs of said components, and in which at least one component control parameter (P, I or D) is of variable magnitude for control purposes, said controller stage being responsive to said output of said comparison stage and having its output connected for control of said mechanical device, said apparatus incorporating the improvement comprising:

first means for detecting engine speed fluctuations deviating upward and downward of said reference desired speed value with a speed deviation characteristic exceeding a predetermined speed deviation characteristic and for providing an output signal when said fluctuations deviate both upward and downward of said reference speed value with a speed deviation characteristic exceeding said predetermined characteristic continue for a predetermined period of time, and second means, responsive to said output signal of said first means for increasing the idling speed of said engine indirectly by reducing the magnitude of said at least one variable component control parameter of said controller stage.

2. Apparatus for regulating the idling speed of an internal combustion engine of which the speed is controllable by a throttle valve in the intake duct of the engine, said apparatus including an electrically operable mechanical device (24) for determining the rate of air intake in the idling condition by setting a minimum-air-intake limit for the air intake control function performed by said throttle valve, means (28) for producing an electrical signal representative of a reference desired speed value and having at least one control input for modifying said signal and said reference desired speed value, an electrical comparison stage (16) for comparison of actual engine speed with said reference desired speed value and having an output representative of said comparison result, a controller stage (18, 19, 20) having components respectively of the proportional integral and differential (PID) behavior types, and means for combining the outputs of said components, and in which at least one component control parameter (P, I or D) is of variable magnitude for control purposes, said controller stage being responsive to said output of said comparison stage, and having its output connected for control of said mechanical device (24), said apparatus incorporating the improvement comprising:

first means, for detecting an excessively rich air-fuel mixture in said intake duct, and second means, responsive to said air-fuel mixture richness detecting means, for increasing the idling speed of said engine indirectly by furnishing a control signal to said control input of said means (28) for producing an electrical signal representative of a reference desired speed value and thereby raising said reference desired speed and said signal representative thereof furnished to said comparison stage.

3. Apparatus for regulating the idling speed of an internal combustion engine, of which the speed is controllable by a throttle valve in the intake duct of the engine, said apparatus including an electrically operable mechanical device (24) for determining the rate of air intake in the idling condition by setting a minimum-air-intake limit for the air intake control function performed by said throttle valve, an electrical comparison stage (16, 28) for comparison of actual engine speed with a reference desired speed value and providing an output representative of said comparison, a controller stage (18, 19, 20) having components respectively of proportional, integral and differential (PID) behavior types and means for combining the outputs of said components, and in which at least one component control parameter (P, I or D) is a variable magnitude for control purposes, the output of said comparison stage being furnished in parallel to said proportional and integral components (18, 19) and being also supplied to a first summing device (21) for addition of the output of said integral component to the output of said comparison stage, the output of said first summing device being furnished to the input of said differential component (20) and the output of said differential component being furnished to a second summing device (23) for addition thereto of the output of said proportional component (18), the output of said second summing device being an output of said controller stage for supply directly or indirectly to said mechanical device, a regulation range limiting signal generator (22) being provided, having a plurality of inputs, including at least one control input, a feedback input connected to the output of said second summing device (23) and an output for furnishing an output signal thereof for subtraction in said first summing device (21) from the sum of the outputs of said comparison stage and of said integral component of said controller stage, and constituted for providing upper and lower limits for the regulating range of said controller stage at least during the idling condition of the engine, said apparatus incorporating the improvement comprising:

first means (35) for detecting of engine speed fluctuations deviating upward and downward of said reference desired speed value with a speed deviation characteristic exceeding a predetermined speed deviation characteristic and for providing an output signal when said fluctuations deviate both upward and downward of said reference speed value with a speed deviation characteristic exeeding said predetermined characteristic continue for a predetermined period of time, and second means, forming part of said regulation range limiting signal generator (22) and responsive to said output of said first means for supplying siad output signal to said first summing device (21) for subtraction therein in such magnitude as to raise the lower limit of the regulation range of said controller stage.

4. Apparatus for regulating the idling speed of an internal combustion engine, of which the speed is controllable by a throttle valve in the intake duct of the engine, said apparatus including an electrically operable mechanical device (24) for determining the rate of air intake in the idling condition by setting a minimum-air-intake limit for the air intake control function performed by said throttle valve, an electrical comparison stage (16, 28) for comparison of actual engine speed with a reference desired speed valve and providing an output representative of said comparison, a controller stage (18, 19, 20) having components respectively of proportional, integral and differential (PID) behavior types and means for combining the outputs of said components, and in which at least one component control parameter (P, I or D) is a variable magnitude for control purposes, the output of said comparison stage being furnished in parallel to said proportional and integral components (18, 19) and being also supplied to a first summing device (21) for addition of the output of said integral component to the output of said comparison stage, the output of said first summing device being furnished to the input of said differential component (20) and the output of said differential component being furnished to a second summing device (23) for addition thereto of the output of said proportional component (18), the output of said second summing device being an output of said controller stage for supply directly or indirectly to said mechanical device, a regulation range limiting signal generator (22) being provided, having a plurality of inputs, including at least one control input, a feedback input connected to the output of said second summing device (23) and an output for furnishing an output signal thereof for subtraction in said first summing device (21) from the sum of the outputs of said comparison stage and of said integral component of said controller stage, and constituted for providing upper and lower limits for the regulating range of said controller stage at least during the idling condition of the engine, said apparatus incorporating the improvement comprising:

first means, for detecting an excessively rich air-fuel mixture in said intake duct anf furnishing an output signal to said control input of said regulation range limiting signal generator (22), and second means, forming part of said regulation range limiting signal generator (22) and responsive to said air-fuel mixture richness detecting means, for supplying said output signal to said first summing device (21) for subtraction therein in such magnitude as to raise the lower limit of the regulation range of said controller stage.

5. Apparatus for regulating the idling speed of an internal combustion engine of which the speed is controllable by a throttle valve in the intake duct of the engine, said apparatus including an electrically operable mechanical device (24) for determining the rate of air intake in the idling condition by setting a minimum-air-intake limit for the air intake control function performed by said throttle valve, an electrical comparison stage (16, 28) for comparison of actual engine speed with a reference desired speed value, and providing an output representative of said comparison, a controller stage (18, 19, 20) having components respectively of the proportional, integral and differential (PID) behavior types, and means for combining the outputs of said components, and in which at least one component control parameter (P, I or D) is of variable magnitude for control purposes, said controller stage being responsive to the output of said comparison stage, and having its output connected for control of said mechanical device 24, said apparatus incorporating the improvement comprising:

first means, for detecting an excessively rich air-fuel mixture in said intake duct, and second means, responsive to said air-fuel mixture richness detecting means, for for increasing the idling speed of said engine indirectly by reducing the magnitude of said at least one variable component contrtol parameter of said control stage.

6. Apparatus for regulating the idling speed of an internal combustion engine of which the speed is controllable by a throttle valve in the intake duct of the engine, said apparatus including an electrically operable mechanical device (24), for determining the rate of air intake in the idling condition by setting a minimum-air-intake limit for the air intake control function performed by said throttle valve, means (28) for producing an electrical signal representative of a reference desired speed value and having at least one control input for modifying said desired speed value and said signal representative thereof, an electrical comparison stage (16) for comparison of actual engine speed with a said reference desired speed value and having an output representative of said comparison result, a controller stage (18, 19, 20) having components respectively of the proportional, integral and differential (PID) behavior types, and means for combining the outputs of said components, and in which at least one component control parameter (P, I or D) is of variable magnitude for control purposes, said controller stage being responsive to said output of said comparison stage, and having its output connected for control of said mechanical device (24), said apparatus incorporating the improvement comprising:

first means for detecting engine speed fluctuations deviating upward and downward of said reference desired speed value with a speed deviation characteristic exceeding a predetermined speed deviation characteristic and for providing an output signal when said fluctuations deviate both upward and downward of said reference speed value with a speed deviation characteristic exceeding, said predetermined characteristic continue for a predetermined period of time, and second means, responsive to said output signal of said first means, for increasing the idling speed of said engine indirectly by furnishing a control signal to said control input of said means (28) for producing an electrical signal representative of a reference desired speed value and thereby raising said reference desired speed value and said signal representative thereof furnished to said comparison means.

7. Apparatus according to claim 1, 6 or 3 in which said first means is constituted for detecting engine speed fluctuations deviating upward and downward of said reference desired speed value beyond respective predetermined engine speed thresholds above and below said reference desired speed value, and for providing an output signal when engine speed fluctuations deviating upward and downward of said reference desired speed value beyond both of said speed threshold values continue for a predetermined period of time.

8. Apparatus according to claim 2 or 4 in which said first means includes an exhaust gas probe disposed in an exhaust duct of said engine for producing an output signal to which said means responsive to said detecting means is designed to respond, when said probe output signal remains in the range of signal magnitude ($\lambda$) representing rich mixtures for a period of time exceeding a predetermined period of time.

9. Apparatus according to claim 7 or 3 in which said first means is constituted for providing an output when fluctuations of engine speed have exceeded a predetermined reference magnitude value and have been both positive and negative.

10. Apparatus according to claim 1, 7 or 3 in which said first means is constituted to generate a signal representative of engine acceleration and to derive therefrom an output for said second means when the engine acceleration in either the positive or negative direction has exceeded a predetermined value of acceleration and has been both positive and negative.

* * * * *